(12) United States Patent
Madan et al.

(10) Patent No.: US 7,966,352 B2
(45) Date of Patent: Jun. 21, 2011

(54) CONTEXT HARVESTING FROM SELECTED CONTENT

(75) Inventors: Vikram Madan, Bellevue, WA (US); Issa Khoury, Bellevue, WA (US); Gerhard Schobbe, Bellevue, WA (US); Guy Barker, Kirkland, WA (US); Judy Tandog, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 10/766,319

(22) Filed: Jan. 26, 2004

(65) Prior Publication Data

US 2005/0165839 A1    Jul. 28, 2005

(51) Int. Cl.
*G06F 12/00*    (2006.01)
*G06F 17/30*    (2006.01)

(52) U.S. Cl. ........ 707/821; 715/255; 715/781; 707/915; 707/917; 705/901; 345/173; 345/179; 382/176; 382/181; 382/229; 382/282

(58) Field of Classification Search ................ 707/104.1
See application file for complete search history.

(56) References Cited

U.S. PATENT DOCUMENTS

| | | | | |
|---|---|---|---|---|
| 5,983,215 A * | 11/1999 | Ross et al. | ........ | 707/2 |
| 6,334,157 B1 * | 12/2001 | Oppermann et al. | ........ | 719/310 |
| 6,690,394 B1 * | 2/2004 | Harui | ........ | 715/762 |
| 6,762,777 B2 * | 7/2004 | Carroll | ........ | 715/808 |
| 7,042,594 B1 * | 5/2006 | Dawe et al. | ........ | 358/2.1 |
| 7,467,134 B2 * | 12/2008 | Bayiates | ........ | 1/1 |
| 2002/0076109 A1 * | 6/2002 | Hertzfeld et al. | ........ | 382/229 |
| 2003/0101156 A1 * | 5/2003 | Newman | ........ | 707/1 |
| 2003/0117378 A1 * | 6/2003 | Carro | ........ | 345/173 |
| 2003/0182630 A1 * | 9/2003 | Saund et al. | ........ | 715/530 |
| 2004/0119762 A1 * | 6/2004 | Denoue et al. | ........ | 345/863 |
| 2004/0123131 A1 * | 6/2004 | Zacks et al. | ........ | 713/200 |
| 2004/0135815 A1 * | 7/2004 | Browne et al. | ........ | 345/810 |
| 2004/0201633 A1 * | 10/2004 | Barsness et al. | ........ | 345/864 |
| 2005/0154993 A1 * | 7/2005 | Chen et al. | ........ | 715/770 |
| 2005/0198354 A1 * | 9/2005 | Holloway, Jr. | ........ | 709/232 |
| 2006/0100849 A1 * | 5/2006 | Chan | ........ | 704/8 |
| 2008/0046837 A1 * | 2/2008 | Beauchamp et al. | ........ | 715/804 |

FOREIGN PATENT DOCUMENTS

WO    WO 01/42980 A1 *    6/2001

OTHER PUBLICATIONS

TechSmith Corporation—Free Hand Capture printout from website, (printed Jun. 4, 2003).
TechSmith Corporation—SnagIt's History printout from website, (printed Jun. 4, 2003).
TechSmith Corporation—Version Comparison Chart printout from website, (printed Jun. 4, 2003).
TechSmith Corporation—SnagIt User's Guide printout from website, (2003).

* cited by examiner

*Primary Examiner* — Alicia M Lewis
(74) *Attorney, Agent, or Firm* — Shook, Hardy & Bacon L.L.P.

(57) ABSTRACT

A system and process for harvesting context information from selected content is described. One may use a stylus to indicate what content is to be captured. The context information that may be associated with selected content may include URLs, file names, folder names, text from the content, and ink.

20 Claims, 11 Drawing Sheets

CONTEXT HARVESTING FROM SELECTED CONTENT

BACKGROUND OF THE INVENTION

1. Field of the Invention

Aspects of the present invention relate to image processing and information manipulation. More specifically, aspects of the present invention relate to obtaining and using context information related to selected content.

2. Description of Related Art

People often rely on graphical representations more than textual representations of information. They would rather look at a picture than a block of text that may be equivalent to the picture. For instance, a home owner may cut out pictures of magazines to show contractors exactly what is desired when remodeling a kitchen or bathroom. Textual representations of the same material often fall short. The tool that the home owner may use is no more complex than a pair of scissors.

In the computing world, however, attempting to capture and convey the identical content is cumbersome. Typical computer systems do not provide an easy interface for capturing and conveying graphically intensive content. Rather, they are optimized for capturing and rendering text. For instance, typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Despite the existence of a stylus, selection of displayed content remains difficult and cumbersome. One needs to copy a screen to a paint program, crop the information, and then forward the information as one desires. However, this process can become difficult with a stylus.

One company, TechSmith Corporation, has introduced Snagit®, a product for capturing screens. Snagit® is mouse-based and requires multiple steps prior to capturing content. Content alone can be bland and not useful. Additional approaches are needed to provide a better user experience by capturing additional information from selected content.

BRIEF SUMMARY

Aspects of the present invention address one or more of the issues mentioned above, thereby providing a better context gleaning and associating approach. Information relating to how, when, where, and others may be associated with selected content.

These and other aspects are addressed in relation to the Figures and related description.

DETAILED DESCRIPTION

Aspects of the present invention relate to determining and associating context information with selected content.

A user may initiate a capture process, capture content, and then perform an action on the content. The action may include, but is not limited to, the following:

Emailing;
printing;
copying to a clipboard;
saving;
annotating (including adding handwritten ink and/or highlighting various portions of the captured content);
erasing some or all of the captured content;
selecting some or all of the captured content;
opening an editor to further modify the captured content; and,
terminating the process.

The content capturing may then be combined with context information gleaned from the captured content. This context information may come in a variety of forms. In some instances, it may be referred to as metadata. In other instances, it may represent actual content contained within a selection. To some extent, these latter instances may or may not be referred to as metadata.

This document is divided into sections to assist the reader. These sections include: characteristics of ink, terms, general-purpose computing environment, content capture and use, context capture and association with content, types of context information, and processes for determining context.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence of strokes, where each stroke is comprised of a sequence of points. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Terms

Ink—A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof Further, some properties may be unique to each stroke or point in the stroke (for example, pressure, speed, angle, and the like). These properties may be stored at the stroke or point level, and not at the ink level Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

General-Purpose Computing Environment

Figure 1:
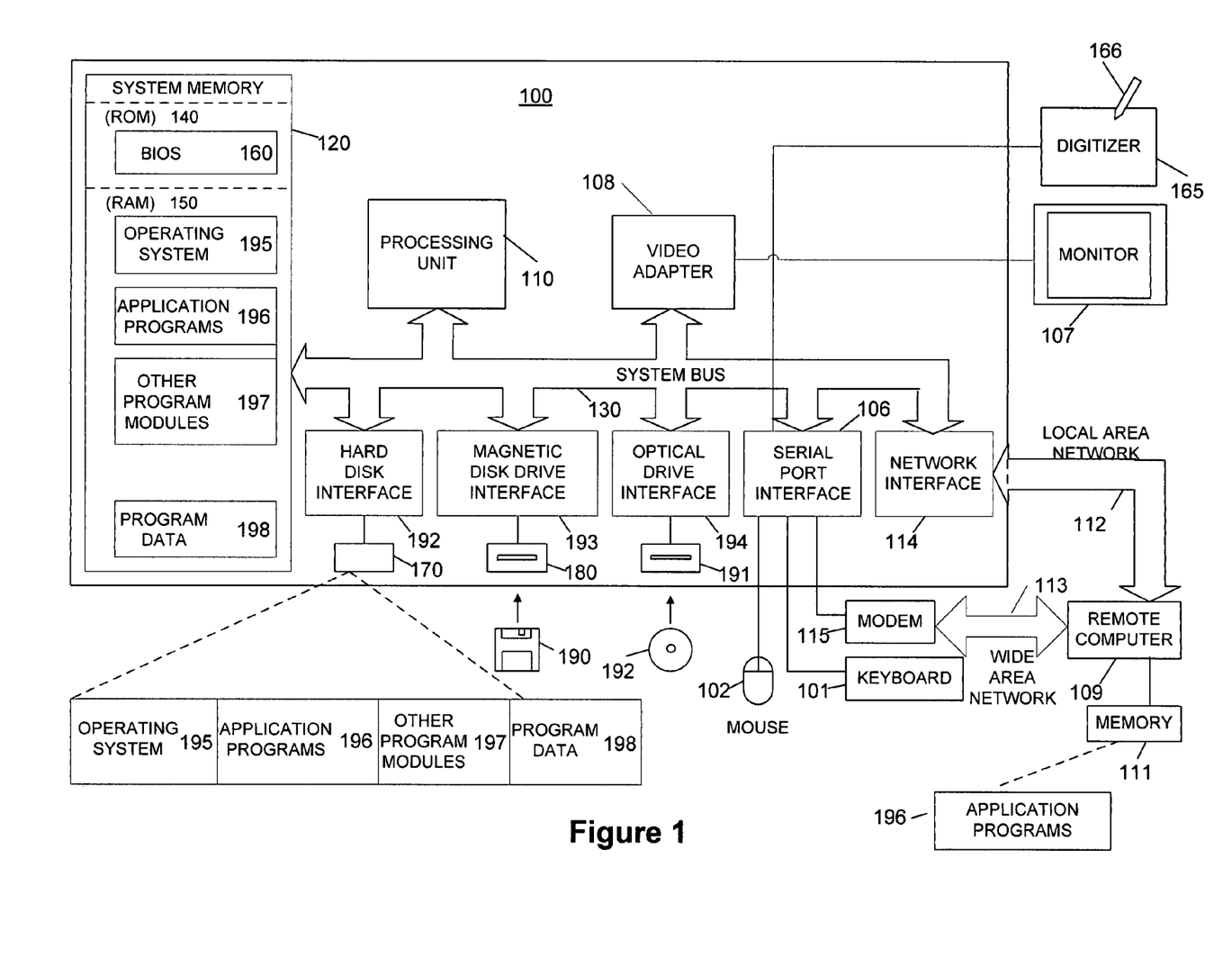
FIG. 1 shows a general-purpose computer supporting one or more aspects of the present invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above-relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. Further, the system may include wired and/or wireless capabilities. For example, network interface 114 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
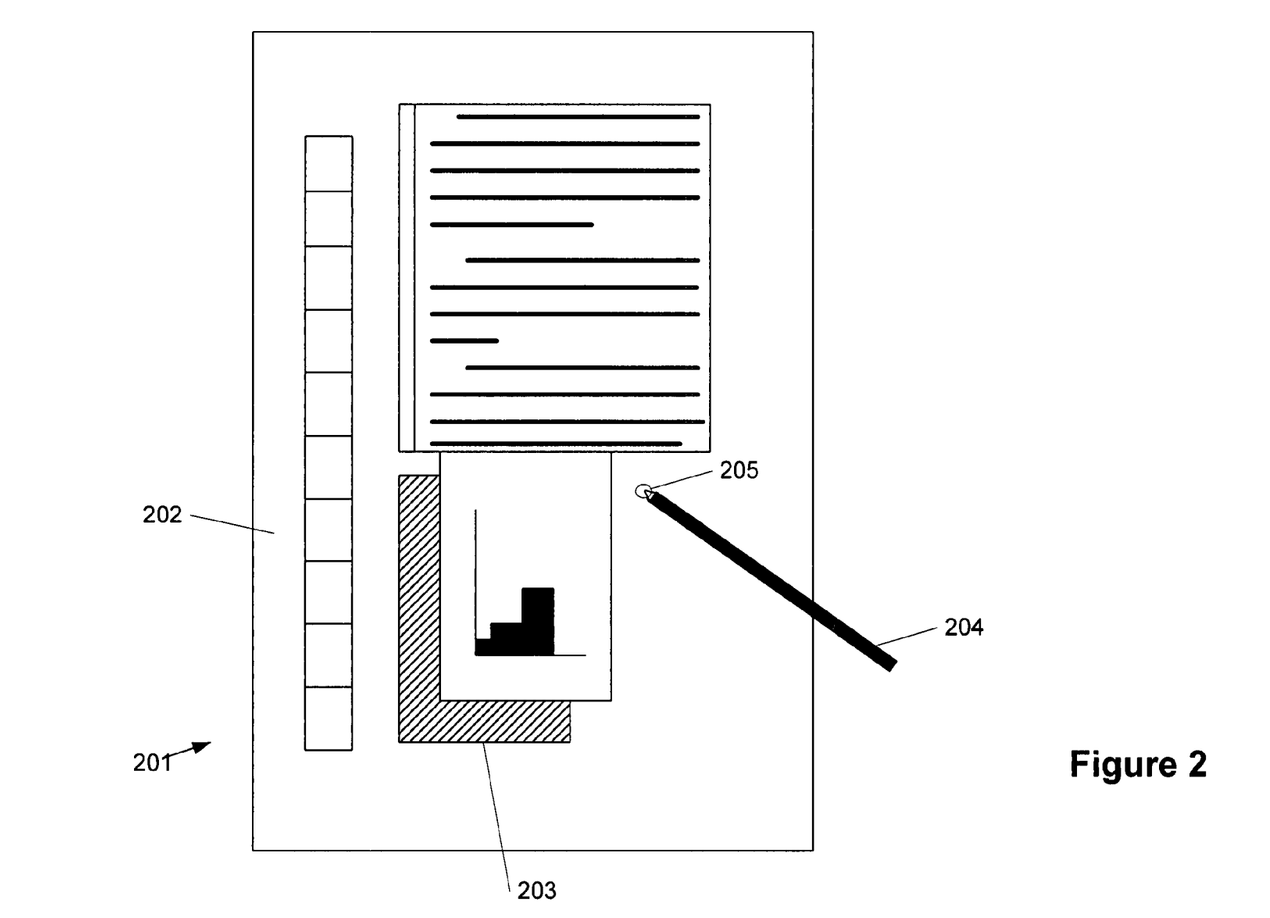
FIG. 2 shows a display for a stylus-based input system according to aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the Net programming model from Microsoft Corporation.

Content Capture and Handling

One of the benefits of a stylus-based computing system is the closeness it brings a user to interacting with printed paper. Instead of being separated by a keyboard and mouse, a stylus-based computer permits a user to more intimately interact with a document and displayed content as easily as one would interact with physical paper. One may use the application with an electromagnetic digitizer, may use a resistive touch screen or the like. The application may use functionality provide with ink (strokes, properties, methods, events, and the like) or may rely on bit mapped images of ink encircling content.

As to capturing and sending content, conventional image capturing tools require significant interaction between the user and the capturing application to specify which type of capturing process is desired and navigation of distracting menus to indicate how the content is handled, even before content is captured.

Aspects of the present invention attempt to eliminate these distractions by making content capturing and handling more intuitive. In one aspect, the system may allow initiation of the capture process, capture, and initiation of an action associated with captured content with three clicks or taps of the stylus.

Figure 3:
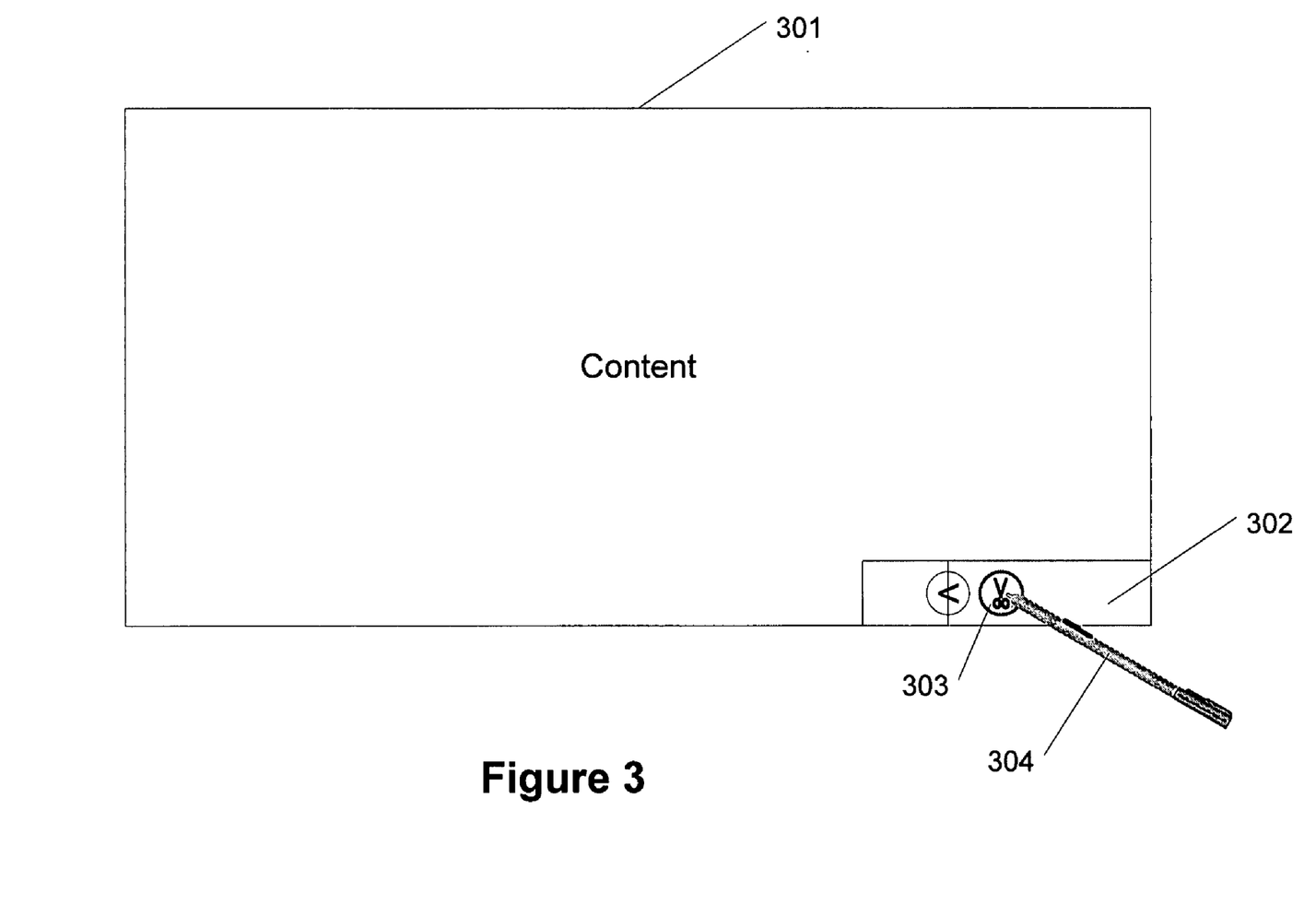
FIG. 3 shows an illustrative interface for activating one aspect of the present invention.

FIG. 3 shows an example of how one may activate the content capture aspect of the present invention. A display on a user's computer is shown as region 301. Region 301 includes content that a user may wish to capture. A user may locate region 302 which includes at least one button 303 in region 301. Upon selection of the button 303 with stylus 304, the content capture aspect of the present invention may be initiated. It is appreciated that other techniques may be used to activate the content capture application including, but not limited to, a gesture of the stylus 304, tapping on a button not in region 302, clicking of a button on stylus 304, pressing a hardware button on a keyboard or a computer's case, and the like. Further, aspects of the present invention may be accessible through application programming interfaces called by another application.

Figure 4:
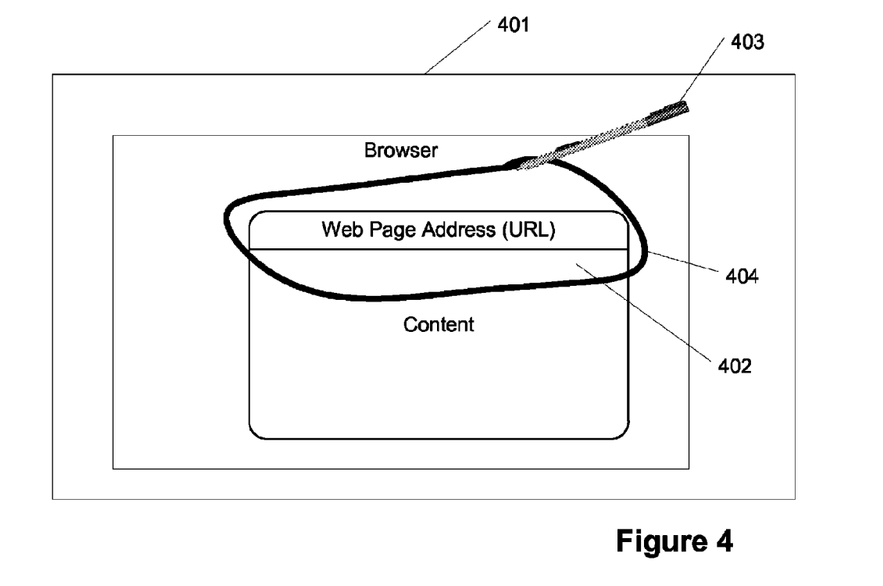
FIG. 4 shows an illustration of the designation of content and an annotation in accordance with aspects of the present invention.

FIG. 4 shows the designation of content in accordance with an aspect of the present invention. Content is displayed in region 401. As an example, a user wants to capture content in the vicinity of region 402. In this case, a user may encircle content in the region 402 by using stylus 403. To provide the user with an indication of the content as being selected, the system may display the track of stylus 403 as path 404. Path 404 may be displayed as thick or thin, opaque ink. Alternatively, path 404 may be displayed as translucent ink so as to permit a user to see the content in the selected region 402 beneath the ink. Further, path 404 may not be displayed as a boundary, but rather may separate various levels of shading to distinguish selected region 402 from other regions. The system may determine the selection of region 402 based on the completion of a closed shape made by the stylus 403. Alternatively, the system may determine the selection based on content partially encircled by the stylus 403 and drawing a connecting line between the stylus' current position and the position where the stylus was first placed on the screen. Also, other techniques of selecting content include rectangular selection, window selection and full screen selection. These alternative selection techniques may be performed by both a mouse and a pen/stylus. Selection feedback may be similar to the feedback described herein.

Figure 5:
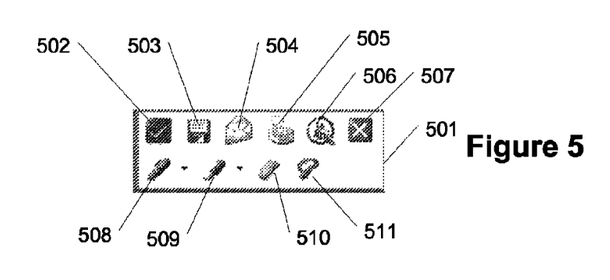
FIG. 5 shows various operations that may be performed on designated content in accordance with aspects of the present invention.

FIG. 5 shows a number of tools available on a toolbar 501. Toolbar 501 may appear after ink path 404 is complete. Alternatively, toolbar 501 may appear after stylus 403 has been lifted off the display. Further, toolbar 501 may appear based on a gesture or click of a button on stylus 403.

Toolbar 501 includes a number of options that may be used with the designated content in selected region 402. For instance, a user may copy designated content in selected region 402 to a clipboard upon selection of a first button 502. A user may save the content of region 402 by selection of button 503. A user may e-mail the content of region 402 upon selection of button 504. The email feature permits users to easily share information by emailing the captured image and any annotation, or by copying it to a clipboard so that it can be pasted into another program.

A user may print the content of region 402 upon selection of button 505. Upon selection of button 506, the system may open a content selection editor where the content of designated region 402. Further, the system may display multiple selection regions 402 to a user at the same time, providing a user with the ability to compare the content of multiple selection regions 402 against each other. This may facilitate comparison shopping over the Internet without the need to open and maintain separate open windows.

Upon selection of button 508, the user may be able to change a pen width and/or color of the ink. Using the pen functionality of button 508, the user may then annotate the captured content as simply as annotating on a piece of paper. Upon selection of button 509, the user may be able to change the pen width of a highlighter and/or color of the highlighter. Users may write words, circle objects, highlight objects (with, for instance, subtractive rendering so that the object below can be seen through the highlighting or with opaque ink), and effectively do anything else akin to annotating a piece of paper with a pen.

Upon selection of button 510, the user may erase some or all of the content in region 402. Upon selection of button 511, the user may operate a selection tool to further select some or all of the content of region 402. Finally, upon selection of button 507, the toolbar 501 and region 402 may be closed.

Figure 6:
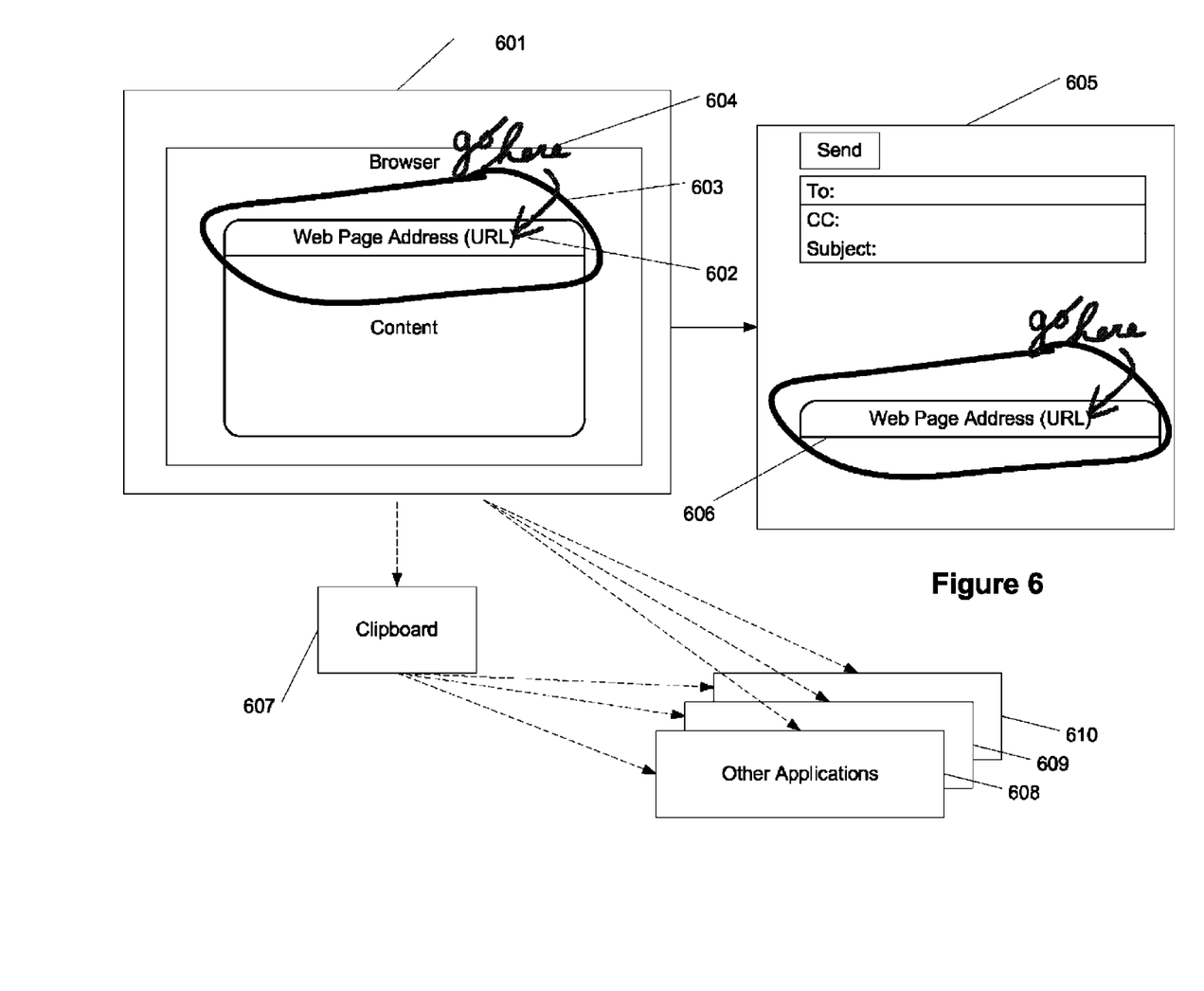
FIG. 6 shows the processing of designated content in accordance with aspects of the present invention.

FIG. 6 shows the processing of designated content in accordance with aspects of the present invention. A region 601 includes designated content 602, border 603 which defines the shape of content 602, and an annotation 604. The designated content with additional information (optional, but shown here as border 603 and annotation 604) may be forwarded to an email client (for instance) for handling. Here, as shown by draft email 605, the content 602 and optional additional information may be provided in the email as 606 or may be included as an attachment. Other actions may be performed on content 602. For instance, the content 602 may be copied to a clipboard 607, and then forwarded to other applications 608-610. Alternatively, content 602 may be forwarded directly to other applications 608-610.

The content captured by aspects of the present invention may include static content (for example, images) or underlying data. For instance, underlying text (for example, HTML links, words, sentences, and/or paragraphs) may be captured. Also, underlying objects (for instance, stock tickers, calendars, files being displayed or played) and underlying associations with remote content (for instance, the location of a music file being played locally) may be captured. Further, meta-data including the person capturing the information, the date and time capture may be associated with the captured information as well. The source of the content may be identified as well.

More than one region may be selected. For instance, by holding down a button (performing a gesture or the like) one may designate that additional content should be selected. In this regard, one may have another gesture or a button act as the indication that all desired content has been selected.

Aspects of the present invention may be implemented as a stand-alone application. Alternatively, aspects of the present application may be incorporated into a shell providing a graphical user interface to a user. In one example, the capturing tool may be integrated into an Internet browser.

Context Capture and Association with Content

Content alone can be meaningless. For instance, the fact that someone selects a statistic on a web page and sends a selected area with the statistic alone may have no value. However, a link back to the location of the web site may make the statistic have significant value. The same rationale may be applied to news stories, photographs, text, and the like. The link may be implicit or explicit. An implicit link may be hidden behind a displayed selection so that tapping on the displayed selection may activate the link. This link may never be exposed to a user, may be exposed during a mouse-over or stylus hover event, or may be exposed to the user upon request. An explicit link may be shown in conjunction with the selected content (for instance, above, below, around the side, and the like).

Figure 7:
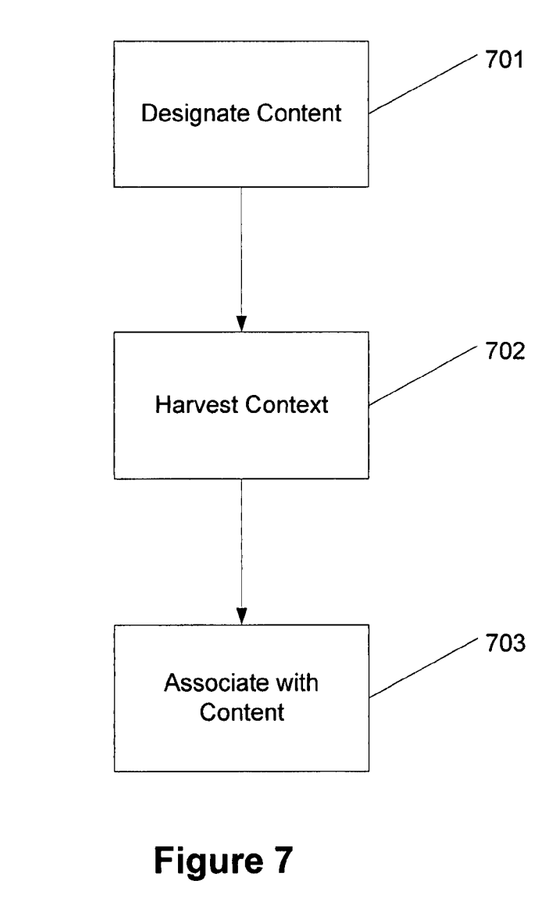
FIG. 7 shows a process for obtaining and associating context information with selected content in accordance with aspects of the present invention.

FIG. 7 shows a process in which content is designated in step 701, context information is harvested in step 702, and the context information is associated with content in step 703. All three steps may occur on the same machine within a short period of time. Alternatively, the various steps may be separated from each other. For instance, the "designate content" step 701 may be separated from the "harvest context" step 702 such that the content may be processed at a first location or a first location or a first time and the context harvesting occurring at a second location or a second time. A user may be running low on batteries or may be using a relatively slow processor and wish that the context harvesting to be delayed until a later time.

Further, two users may invoke the process of FIG. 7. A first user may designate content 701. A second user may harvest context information 702 from the designated content and associate it with the designated content in step 703. For instance, the first user may highlight a URL while the second user may navigate to the site identified by the URL and harvest content from that location. Other variations are possible. The content may be forwarded in various forms to another user as shown in FIG. 6. For instance, one may email the selected content with context information to another. Also, one may send the selected content with context information to another. The context information may be stored as a separate file or may be stored with the image of the selected content. For instance, if the selected content is transmitted as a JPEG format or any file format that includes a comment field or fields, the context information may be parsed and transmitted in the comment field or fields. If the recipient has a system that is enabled to use the context information, this information may be extracted and provided to the user.

Figure 8:
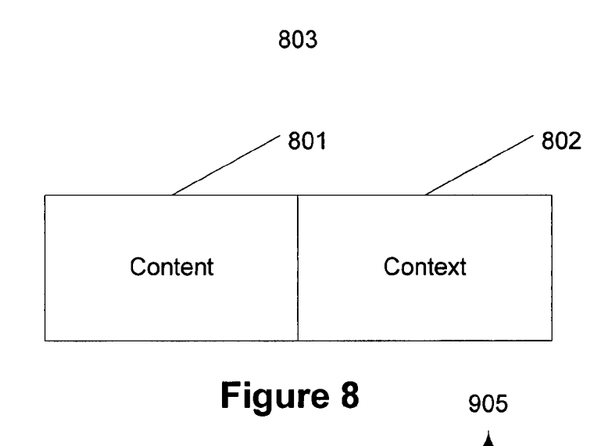
FIGS. 8 and 9 shows various representations of file structures that may support the association of context information with content in accordance with aspects of the present invention.
Figure 9:
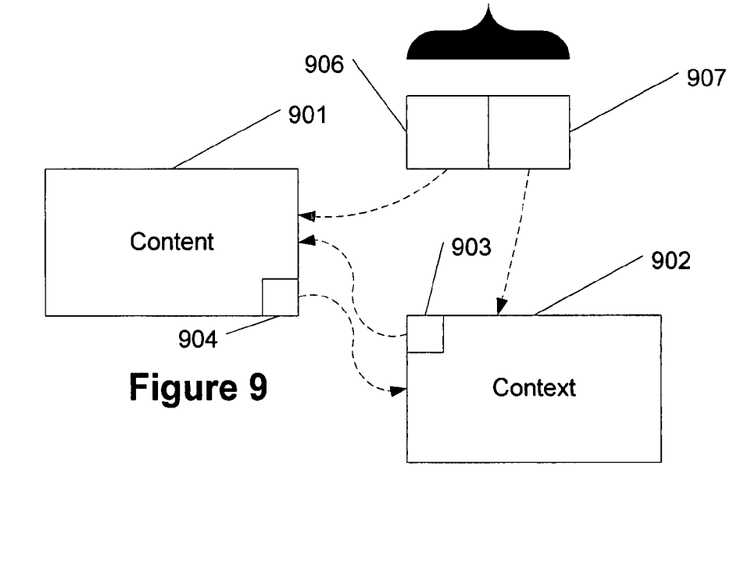

FIGS. 8 and 9 show two techniques of associating content and context information. First, in FIG. 8, the content 801 and context 802 may both be part of the same file structure 803.

FIG. 9 shows another technique for associating content 901 and context 902. Here, the two sets of information are not part of the same file structure. Rather, at least one pointer 903 from context 902 may point to the associated content 901. Alternatively or in addition, at least one pointer 904 may point from content 901 to the associated context 902. Further, a separate linking structure (for instance a table or database entry) 905 may include one or more pointers or other identifying information (for instance a title or file reference) that relates content 901 with 902. In the pointers example, the two pointers are represented by pointers 906 and 907.

Types of Context Information

Figure 10:
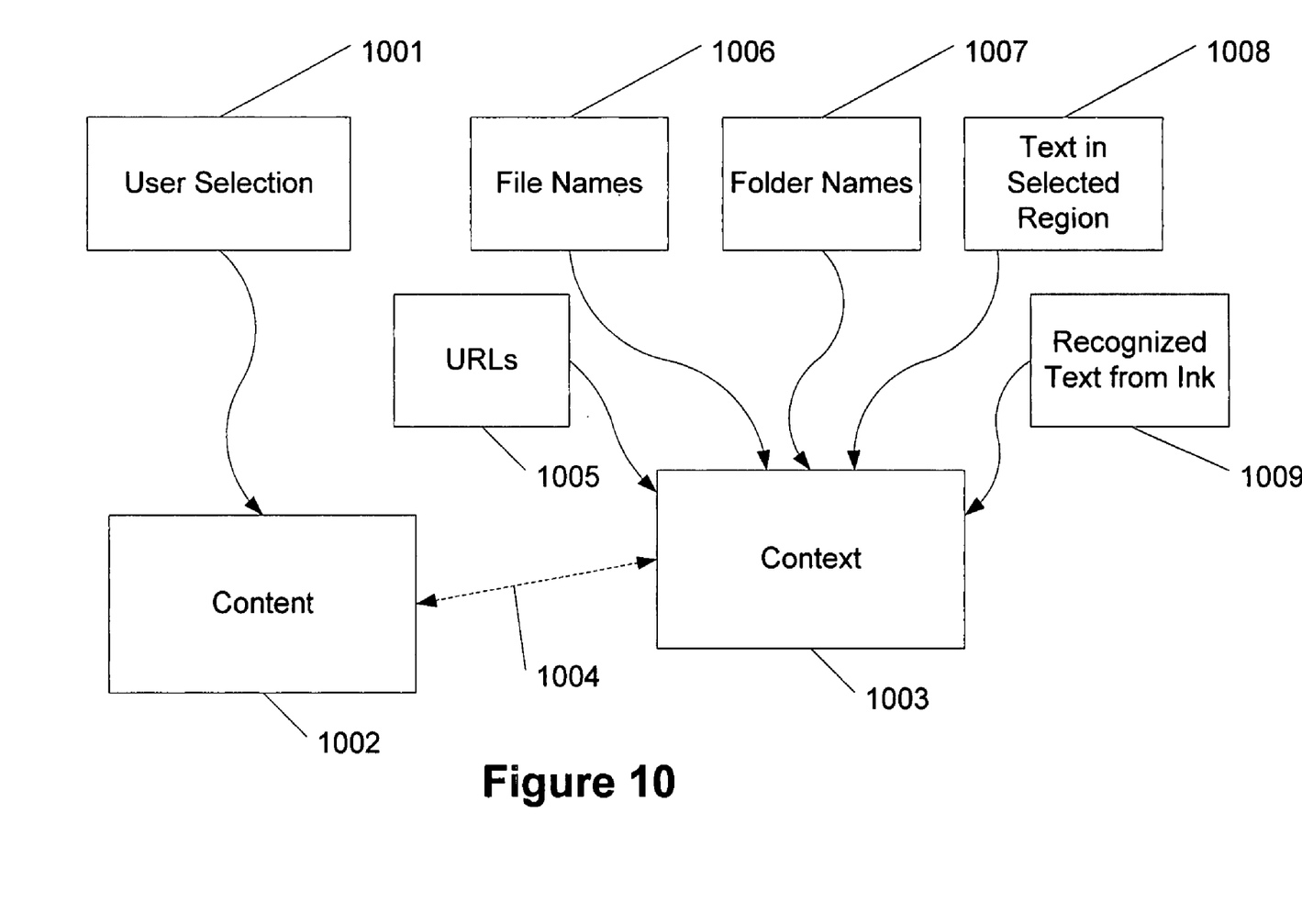
FIG. 10 shows illustrative information that may become part of the context information associated with selected content in accordance with aspects of the present invention.

FIG. 10 shows various information that may become part of the context associated with selected content. A user selection 1001 becomes part of content 1002. Context 1003 may be associated (arrow 1004) by a variety of processes as described with relation to FIGS. 8 and 9. Context 1003 may include the following: uniform resource locators (URLs) 1005 of web pages or information in content 1002, file names 1006 of files captured in content 1002, folder names 1007 of folders captured in content 1002, text in selected region 1008 whose boundaries were determined from the user selection 1001, and recognized text from ink 1009 within the content 1002.

The context information may be displayed to the user in various ways. For instance, the context may be displayed as a property in a window or when hovering over the content 1003. Also, to some extent, the context may be modified. For instance, a derived title of the content may be taken from a URL. However, as some URLs are meaningless to users when the URLs include CGI script or ASP information, titles of the content may be modified to provide a better understanding of what is represented by the content. As an example, a title may be represented by a web address including data.asp?loc=123&sku=70012330 that attempts to look up sku number 70012330. Sku numbers are meaningless to the average consumer while the content of the page (e.g., a camcorder) has value. Accordingly, a user may edit the title to reflect a title that they can use to more accurately indicate the significance of the content to them, e.g. "Camcorder on Sale."

Some content may be restricted by digital rights management (DRM) licenses. The context information may include preventive measures that prevent the association of context with content. These measures may or may not be used to prevent the designation of content in the first place. Further, these measures may enable one to determine the history of content. For instance, these measures may prevent any history from being associated with content. Alternatively, these measures may only allow the most recent history to be associated with content. Further, these measures may permit all history and information to be associated with content. These measures may be controlled by the operating system or may be controlled by an application.

Referring back to FIG. 6, designated content 602 encompasses at least part of a web page. The URL of the web page may be determined and added to context 1003.

Figure 11:
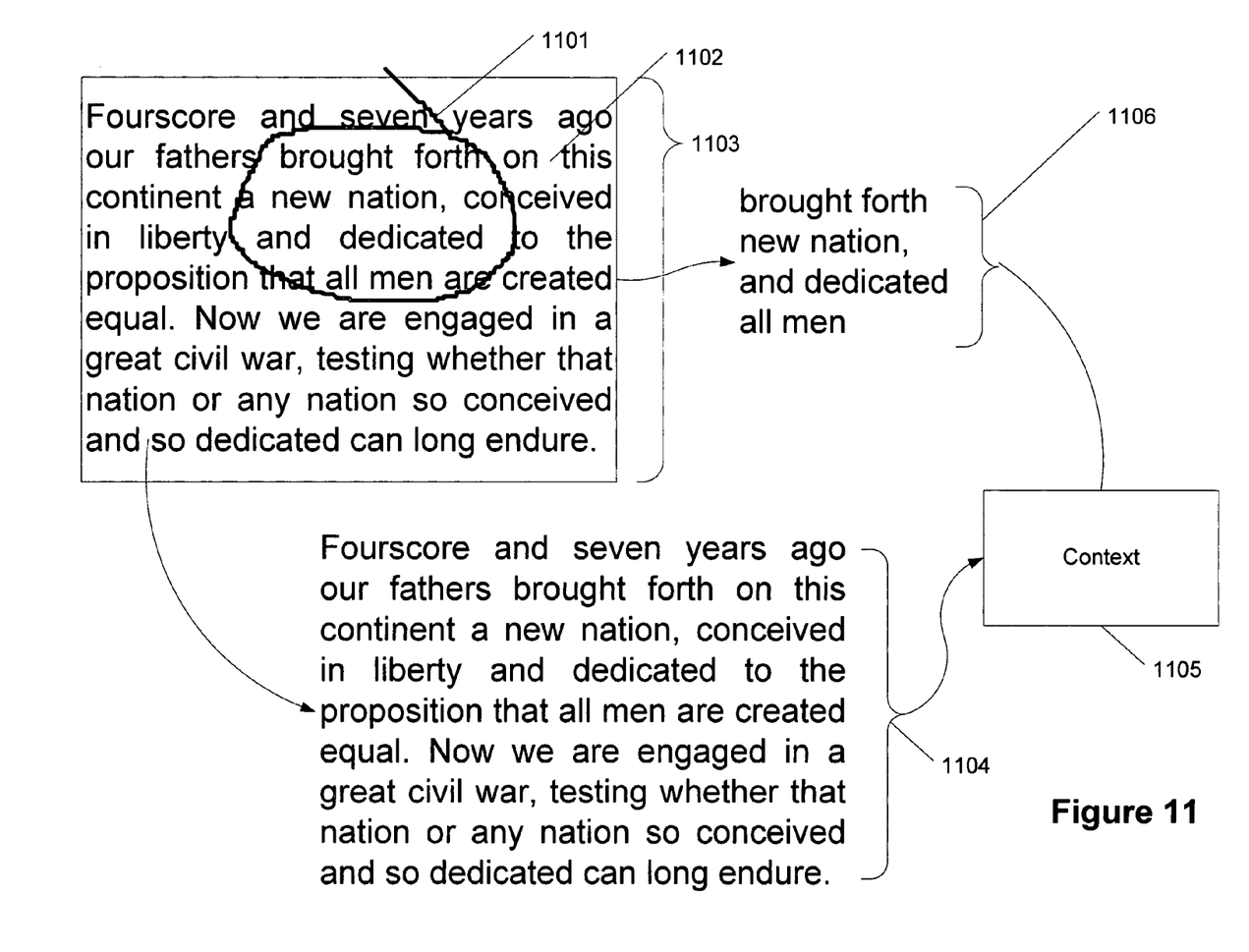
FIGS. 11-12 shows various degrees of context that may be used in accordance with aspects of the present invention.

Referring to FIG. 11, a user has selected with a selection region 1101 a portion of text 1102 as displayed in region 1103. At least two approaches may be used to capture the text underlying the selected region 1101. In a first instance, the entire text 1104 from region 1103 may be captured and added to context 1105. Amount of information captured from region 1103 may be defined by the size of the physical display (text not shown on a display are not captured), the size of region 1103 (text not actually shown but scrollable through region 1103), the punctuation in text 1102 (so as to capture full sentences, full paragraphs, full chapters, etc.), and the like.

In an alternative approach, only complete characters or words may be captured. This may depend on the size of selection 1101. The resulting text 1106 may then be added to context 1105.

The capturing of text may also include the capturing of associated links to embedded pictures, photographs, and the like. Active content information may also be captured including, for instance, content and how the content has changed.

Figure 12:
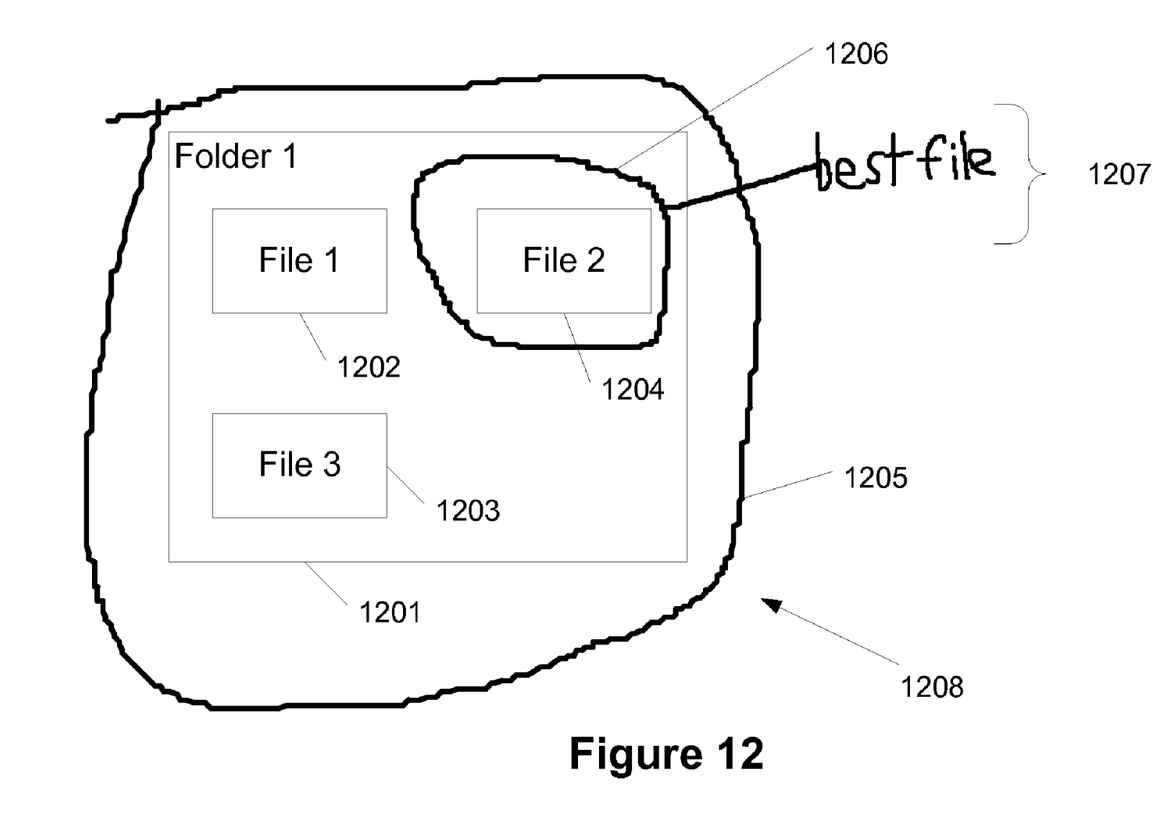

FIG. 12 shows designation of folders and files. Folder 1201 includes three files: file 1 1202, file 2 1204, and file 3 1203. Selection region defined by loop 1205 includes all the content of folder 1 1201. A rule may be established that only entire folders designated by a selection loop (or other process) 1205 may be included in context 1208. Also, a rule may be established that any part of a folder that is encompassed by a selection loop 1205 may be included with context 1208. Here, selection loop 1205 encompasses folder 1 1201 so under either rule, folder 1 1201 would be selected. Selection of folder 1 1201 may include in context 1208 the folder name and/or path. Context 1208 may or may not contain the files in the selected folder 1 1201.

Selection by selection 1206 of a file, for instance file 2 1204, may or may not include an indication of the folder (folder 1 1201) storing the file 1204. In one example, the path with the folder may be stored. In another example, no path may be stored. In a third example, the identification of the file 1204 may be stored so as to eliminate the need to remember the path or location of a file to access it.

Annotations 1207 may also be stored in context 1208. The annotations may take the form of text or electronic ink. If in ink, they may be kept in their original ink form, may be converted to text, or may be stored in both their original and converted forms to enable searching and reproduction of the original ink.

Processes for Determining Context

For sake of explanation, the extracted context is separated into two categories. The first category relates to information related to the visual information in the content. The visual information may or may not be independent of any text actually displayed in the content. The second category relates to actual text drawn from the content.

Figure 13:
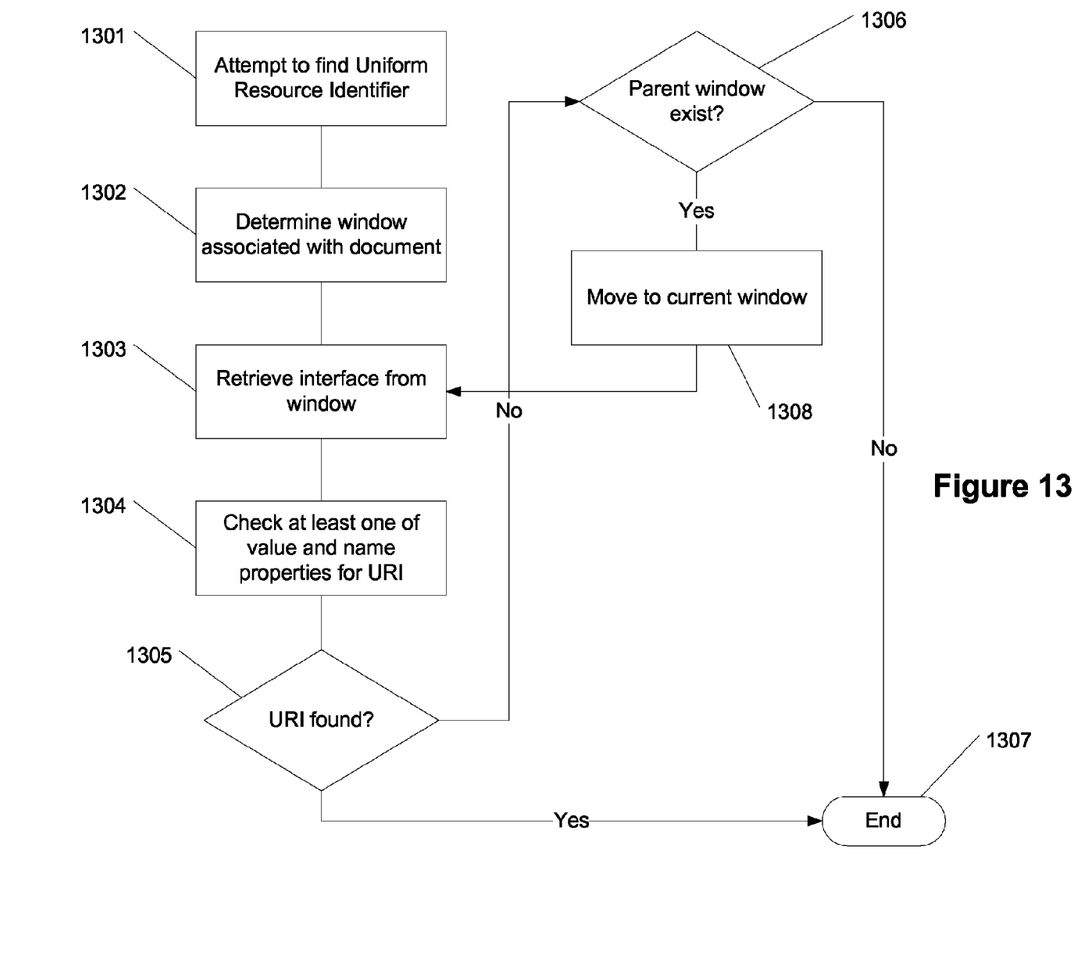
FIG. 13 shows an illustrative process for determining context information in accordance with aspects of the present invention.

FIG. 13 relates to the first category. Once a region has been designated, the system attempts to find a uniform resource identifier in step 1301. This may be the title of a file, the identifier of a file, the name of a folder, a URL, and the like. A variety of techniques may be used to extract text related to information in the selected region. In one example, the system may use the COM Accessibility technology to extract text related to the window within a selected region. Here, the system determines which window is relevant in step 1302. The window will often be the window associated with a document displayed within an application. Alternatively, the window may be a top-level application window.

The following describes the COM Accessibility APIs. Of course, other approaches may be used. The system next uses the AccessibleObjectFromWindow API to retrieve an IAccessible interface from the window of interest in step 1303. Whether an IAccessible can be retrieved depends on the application that created the window. Many applications support this interface as Assistive Technology products rely on the interface to make the application accessible.

The IAccessible interface provides a name property and a value property. These properties are both text strings. The contents of these strings are defined by the application which created the window of interest. These strings are also accessed by Assistive Technology products, (e.g. screen readers), and so the text will normally relate to the window. The system attempts to find a URI in at least one of the value and name properties in step 1304. The system may first query the value field or the name field or use information from both. If, in step 1305, a URI is found, then the process ends in step 1307. If not, then the system uses the parent window of the current window being examined as shown in step 1306. If the parent window exists in step 1306, then the parent window becomes the current window in step 1308 and the system performs steps 1303-1305 again. If there are no parent windows, then the system ends in step 1307.

The above steps often lead to a URI being found that is related to the visuals being selected. For example, the URI might be an Internet URL if the selected region relates to a web page in a browser, or the URI may be a document name if the selected region relates to a document viewing application.

The second group relates to determining text displayed in a selected region. In a first approach, a system may apply optical character recognition to the visual content of a selected region. The result may then be stored as context information.

Figure 14:
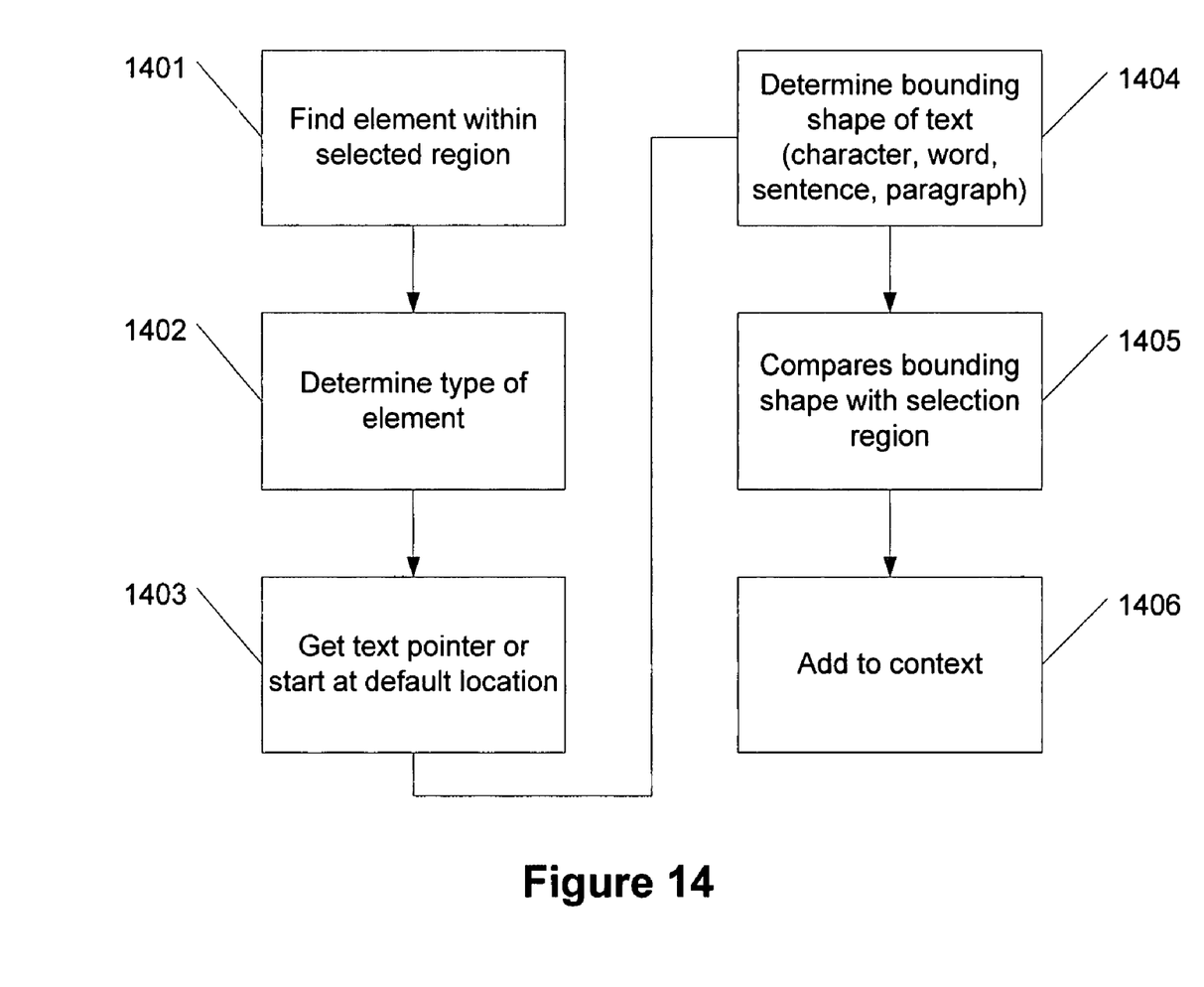
FIG. 14 shows another illustrative process for determining context information from selected content.

In a second approach, shown in FIG. 14, a system has access to the underlying text and needs to determine which characters, words, sentences, paragraphs, and the like should be included as part of the context information.

In this illustrative example, the system attempts to find only the text that is displayed within the selected region (for instance, the region defined by loop 1101). Accessibility information is helpful in determining the underlying text. For accessibility information that does not provide the location of the text, one may attempt to do a graphical match for the text in the selected region with the underlying text to determine the actual text shown in the selected region.

Alternatively, for accessibility information that may include the location of text, one may use the accessibility information to determine an element in the selected region (step 1401). The selected element may be anywhere in the selected region or may be in the center of the selected region. The element may be considered to be an object that can provide information used by assistive technology products (for instance, text enlargers for visually impaired individuals), and may be associated with a window on the screen. Next, in step 1402, the system attempts to determine the type of element (text, picture, drawing, etc.). If text, then the system moves to step 1403.

In step 1403, the system obtains a text pointer from the element or starts at a default location in the text and starts working its way through the text. In step 1404, the system navigates through the text associated with the window in different ways. For example, the text could be navigated through at a character-by-character level or at a word-by-word level.

In step 1404, the system may then use the above pointer to navigate through the text or a pointer assigned at a default location. The pointer may then be used to obtain details of the text itself. The system may navigate through the text and, for each character or word in the text, determines the bounding box for the character or word. Next in step 1405, the system compares this bounding box with the region that defines the selection. If the character or word is determined to lie entirely within the region, the system then looks up the word or character corresponding to the bounding box and includes this character or word with the harvested context in step 1406. If the character does not lie entirely within the selected region then it may be ignored. The system then repeats the process with the next character or word in the text.

The process may function as described above. Alternatively, performance may be improved by comparing the bounding box of the characters with the bounding box of the selected region itself, prior to testing whether the character lies within the complex border of the selected region. If assumptions are made that the text being obtained is horizontal, then performance may be improved further. (For example, once the text lies beneath the bottom of the bounds of the selected region then all subsequent text lies beneath the bottom of the bounds of the selected region.)

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. A computer-implemented method of capturing and treating content using a computer system having a processor, memory, and data storage subsystems, the computer-implemented method comprising:
   setting a mode of operation to a content capture mode for interpreting user input for the purpose of selecting an on-screen region of a display, and receiving a path drawn by a user, the path defining boundaries of the selected on-screen region of the display, wherein pixels comprising one or more graphical elements representing a first set of one or more textual characters are displayed in the selected on-screen region;
   capturing the pixels displayed within the selected on-screen region, and storing the captured pixels in an image file;
   switching the mode of operation to an annotation mode in response to a user command;
   receiving an annotation drawn by the user on the display, wherein the received annotation is implemented using a plurality of tools via a toolbar, the toolbar appearing after the selecting an on-screen region;
   obtaining context information for the one or more graphical elements by automatically applying text recognition to the annotation, and storing the results of the text recognition as context information via the computer system, wherein certain context information comprises preventive measures that limit an association of history with the one or more graphical elements based upon digital rights management licenses, and
   obtaining additional context information by extracting the first set of one or more textual characters and extracting a second set of textual characters displayed in proximity with the first set,
   wherein the context information and the additional context information are automatically stored in association with the image file.

2. The computer-implemented method according to claim 1, further comprising:
   determining a window associated with the selected on-screen region;
   retrieving an application interface having a Uniform Resource Identifier (URI) property from the determined window or a parent window of the determined window; and
   obtaining the URI property as additional context information, the additional context information being automatically stored in association with the image file.

3. The computer-implemented method of claim 1, further comprising:
   creating and storing a linking structure as the association between the image file and the context information.

4. The computer-implemented method of claim 3, wherein the linking structure is incorporated in a file separate from the stored image file and the stored context information.

5. The computer-implemented method of claim 3, wherein the linking structure includes at least one pointer pointing to the stored image file or the stored context information.

6. The computer-implemented method of claim 1, wherein the context information is stored in such a manner as to be accessible to the user for performing at least one of the following:
   searching for said context information,
   displaying the context information simultaneously with the captured pixels, and navigating a network to a source of the captured image pixels.

7. The computer-implemented method of claim 1, wherein the selected on-screen region is part of a displayed textual region, and the graphical elements comprise a first set of one or more textual characters displayed in the textual region, and the method further comprising:
   obtaining additional context information based on a second set of one or more textual characters displayed in the textual region, the additional context information being automatically stored in association with the image file; and
   obtaining a first pointer between the context information and the textual region, and obtaining a second pointer between the additional context information and the textual region, wherein the first pointer differs from the second pointer.

8. The computer-implemented method of claim 1, wherein the selected on-screen region includes at least a portion of a displayed web page or document, and the method further comprises:
   using an application programming interface (API) to query an application for additional context information, the additional context information being automatically stored in association with the image file, the queried application causing the one or more graphical elements to be displayed.

9. The computer-implemented method of claim 8, further comprising: obtaining a uniform resource identifier (URI) of the web page or document as the context information, the URI being obtained as a result of the query using the API.

10. The computer-implemented method of claim 1, wherein the annotation is stored as originally drawn as additional context information in association with the image file.

11. The computer-implemented method of claim 1, further comprising a link to the one or more graphical elements of the selected on-screen region, the link comprising one of an implicit link hidden behind the one or more graphical elements and an explicit link shown in conjunction with the one or more graphical elements.

12. The computer-implemented method of claim 1, further comprising a separate linking table or database entry utilizing one or more pointers to the one or more graphical elements.

13. The computer-implemented method of claim 1, further comprising displaying the obtained context information to the user as one of displaying a property in a window and hovering over the one or more graphical elements.

14. The computer-implemented method of claim 1, wherein the one or more graphical elements comprise underlying data, underlying objects, and underlying associations with remote content.

15. The computer-implemented method of claim 1, further comprising: navigating through the second sets of textual characters that reside within the path drawn by the user, and subsequently navigating through any sets of textual characters that reside outside the path drawn by the user.

16. The computer-implemented method of claim 1, wherein the received annotation is implemented using a plurality of tools via a toolbar, the toolbar appearing after a stylus has been lifted off the display.

17. A computer-implemented method of context harvesting from selected content using a computer system having a processor, memory, and data storage subsystems, the method:
   receiving a path drawn on a display via user input, the drawn path defining boundaries of a selected on-screen region of the display, the selected on-screen region comprising a plurality of pixels, wherein a displayed content of the selected on-screen region includes textual data and underlying data;
   capturing the plurality of pixels and associated underlying text and associated links to embedded information of the on-screen region by capturing only complete characters or words;
   storing the captured pixels as an image file;
   automatically extracting a character or word from the textual data and extracting complete sentences based upon punctuation as context information in response to determining that the displayed content of the on-screen region includes the textual data via the computer system;
   pointing a first pointer from the context information to the displayed content;
   automatically extracting a property of the underlying data as additional context information in response to determining that the displayed content of the on-screen region includes the underlying data via the computer system, the property comprising at least one of: a file name, a file identifier, a uniform resource locator (URL), a uniform resource identifier (URI), a folder name, or meta-data;
   determining a window associated with the selected on-screen region, and automatically extracting a uniform resource identifier (URI) from a name property or a value property of the window as additional context information;
   pointing a second pointer from the additional context information to the displayed content; and
   storing the extracted context information and additional context information in association with the image file via the data storage subsystem, such that the context information is accessible when viewing the image file.

18. The computer-implemented method of claim 17, further comprising:
   digitizing movements of a stylus across the display in order to receive an annotation; and
   obtaining additional context information based on the received annotation, the additional context information being automatically stored in association with the image file.

19. A computer-implemented method of context harvesting from selected content using a computer system having a processor, memory, and data storage subsystems, the method comprising:
   receiving a display of content comprising at least one of textual data, an executable object, a file, or a link to remote content;
   setting a mode of operation to a content capture mode;
   receiving a path drawn on the display which defines boundaries of a selected on-screen region of the content via user input;
   capturing and storing the selected content as an image file via the data storage subsystem;
   switching the mode of operation to an annotation mode;
   receiving an annotation on the display via the user input;
   performing text recognition on the received annotation as context information;
   pointing a first pointer from the selected content to the context information;

automatically determining via the computer system that the content displayed within the on-screen region includes textual data and underlying data;

automatically extracting as additional context information:

a character or word from the textual data of a bounded region determined to be included in the on-screen region, wherein the character or word that lies completely within the bounded region is extracted as additional context information, and the character or word that does not lie completely within the bounded region is not extracted as additional context information, and a property of the underlying data determined to be included in the on-screen region, the property comprising at least one of: a file name, a file identifier, a uniform resource locator (URL), a uniform resource identifier (URI), a folder name, or meta-data; and relating the selected content to the additional context information via a separate linking structure comprising identifying information;

pointing a second pointer from the selected content to the additional context information; and storing the context information and the additional context information in association with the image file via the data storage subsystem, such that the context information is accessible when viewing the image file.

20. The computer-implemented method of claim 19, wherein the annotation is stored as originally drawn as additional context information in association with the image file.

* * * * *